United States Patent
Park et al.

(10) Patent No.: US 7,304,434 B2
(45) Date of Patent: Dec. 4, 2007

(54) LIGHT GENERATING DEVICE AND LIQUID CRYSTAL DISPLAY APPARATUS HAVING THE SAME

(75) Inventors: Hae-Il Park, Seoul (KR); In-Sun Hwang, Suwon-si (KR); Sang-Yu Lee, Yongin-si (KR); Jin-Seob Byun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 281 days.

(21) Appl. No.: 11/092,610

(22) Filed: Mar. 30, 2005

(65) Prior Publication Data
US 2005/0258761 A1      Nov. 24, 2005

(30) Foreign Application Priority Data
May 24, 2004    (KR)    ............ 10-2004-0036813

(51) Int. Cl.
*H01J 17/16*    (2006.01)

(52) U.S. Cl. ............................. 313/634; 313/493
(58) Field of Classification Search ........... 313/493, 313/634, 635
See application file for complete search history.

(56) References Cited

U.S. PATENT DOCUMENTS 6,424,095 B1 *   7/2002   Hirao et al. ............. 315/169.4

* cited by examiner

*Primary Examiner*—Vip Patel
(74) *Attorney, Agent, or Firm*—Cantor Colburn LLP (57) ABSTRACT

A light generating device including a body, a first electrode and a second electrode, and an LCD apparatus having the light generating device. The body includes a plurality of discharge spaces to generate a light. Volumes of at least two of the discharge spaces are different from each other. The first and second electrodes are on the body. The first and second electrodes overlap with end portions of each of the discharge spaces, respectively.

18 Claims, 9 Drawing Sheets

LIGHT GENERATING DEVICE AND LIQUID CRYSTAL DISPLAY APPARATUS HAVING THE SAME

CROSS-REFERENCE TO RELATED APPLICATION

This application claims priority to and the benefit of Korean Patent Application No. 10-2004-0036813, filed on May 24, 2004, which is hereby incorporated by reference for all purposes as if fully set forth herein.

BACKGROUND OF THE INVENTION

1. Field of the Invention

The present invention relates to a light generating device and a liquid crystal display (LCD) apparatus having the same. More particularly, the present invention relates to a light generating device having improved characteristics and an LCD apparatus having the same.

2. Discussion of the Background

Generally, an LCD apparatus is a flat panel display apparatus that displays an image using a liquid crystal. Since the LCD apparatus may be thin and it does not consume a lot of power, it has been widely used in various fields.

The LCD apparatus is a non-emissive display apparatus. Hence, it may include a backlight assembly that generates light.

A conventional backlight assembly includes a tubular-shaped cold cathode fluorescent lamp (CCFL) as a light source. The backlight assembly having the CCFL may be classified as an edge-illumination or direct-illumination type backlight assembly. The edge-illumination type backlight assembly may include one or two light sources adjacent to a side of a transparent light guiding plate so that a light generated from each of the light sources reflects from a surface of the light guiding plate. The reflected light is incident into an LCD panel. The direct-illumination type backlight assembly may include a plurality of light sources under the LCD panel, a diffusion plate between the light sources and the LCD panel, and a reflecting plate under the light sources. Light generated from the light sources is reflected from the reflecting plate and diffused in the diffusion plate.

However, since the backlight assembly includes the light guiding plate or the diffusion plate, light loss may increase. Additionally, the backlight assembly may be complicated structurally, thereby increasing its manufacturing cost. Furthermore, its luminance uniformity may deteriorate.

A light generating device, which includes a body and an electrode, for overcoming the above-mentioned problems has been utilized. The body's internal space may be divided into a plurality of discharge spaces, and a discharge voltage may be applied to the body through the electrode. The discharge spaces may be connected to one another to normalize their internal pressure. Applying the discharge voltage to the electrode may generate a plasma discharge in the discharge spaces, thereby generating light.

When generating light in the discharge spaces, a luminance of the light generated in each of the discharge spaces adjacent to the body's side may be less than that at the body's central portion. This luminance difference may further increase when the light generating device is combined with a receiving container. Therefore, luminance uniformity may deteriorate, which deteriorates the LCD apparatus' display quality.

SUMMARY OF THE INVENTION

The present invention provides a light generating device that may be capable of generating a light having improved characteristics.

The present invention also provides an LCD apparatus having the above-mentioned light generating device.

Additional features of the invention will be set forth in the description which follows, and in part will be apparent from the description, or may be learned by practice of the invention.

The present invention discloses a light generating device including a body, a first electrode and a second electrode. The body includes a plurality of discharge spaces, and the first electrode and the second electrode are on the body and overlap with a first end portion and a second end portion of the discharge spaces, respectively. Volumes of at least two of the discharge spaces are different from each other.

The present invention also discloses a light generating device including a body, a first electrode and a second electrode. The body includes a plurality of discharge spaces substantially parallel with one another to generate the light, and the first electrode and the second electrode are on the body and overlap with a first end portion and a second end portion of the Is discharge spaces, respectively. A volume of a discharge space at a central portion of the body is less than a volume of a discharge space adjacent to a side of the body. A width of a central portion of the first electrode and the second electrode is less than widths of end portions of the first electrode and the second electrode.

The present invention also discloses a liquid crystal display apparatus including a light generating device, a receiving container, a liquid crystal display panel and an inverter. The light generating device includes a body, a first electrode and a second electrode. The body has a plurality of discharge spaces. Volumes of at least two of the discharge spaces are different from each other. The first and second electrodes are on the body. The first and second electrodes overlap with a first end portion and a second end portion of the discharge spaces, respectively. The receiving container receives the light generating device. The liquid crystal display panel displays an image using a light generated from the light generating device. The inverter is coupled to a rear surface of the receiving container to apply a discharge voltage to the first electrode and the second electrode to drive the light generating device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

It should be understood that the exemplary embodiments of the present invention described below may be modified in many different ways without departing from the inventive principles disclosed herein, and the scope of the present invention is therefore not limited to the illustrated embodiments. Rather, these embodiments are provided so that this disclosure will be through and complete, and will fully convey the concept of the invention to those skilled in the art by way of example and not of limitation.

Hereinafter, the present invention will be described in detail with reference to the accompanying drawings.

Figure 1:
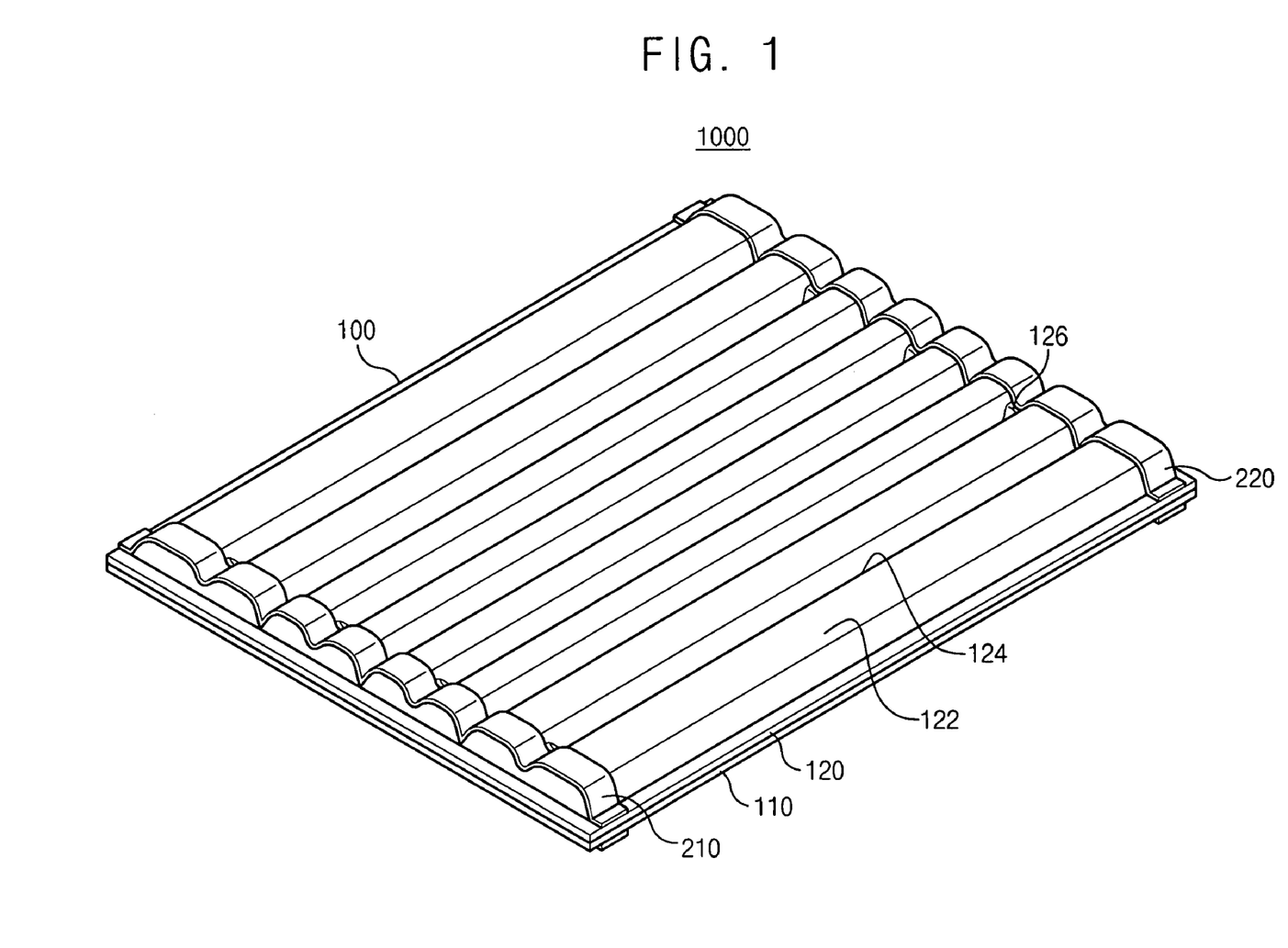
FIG. 1 is a perspective view showing a light generating device in accordance with an exemplary embodiment of the present invention.
Figure 2:
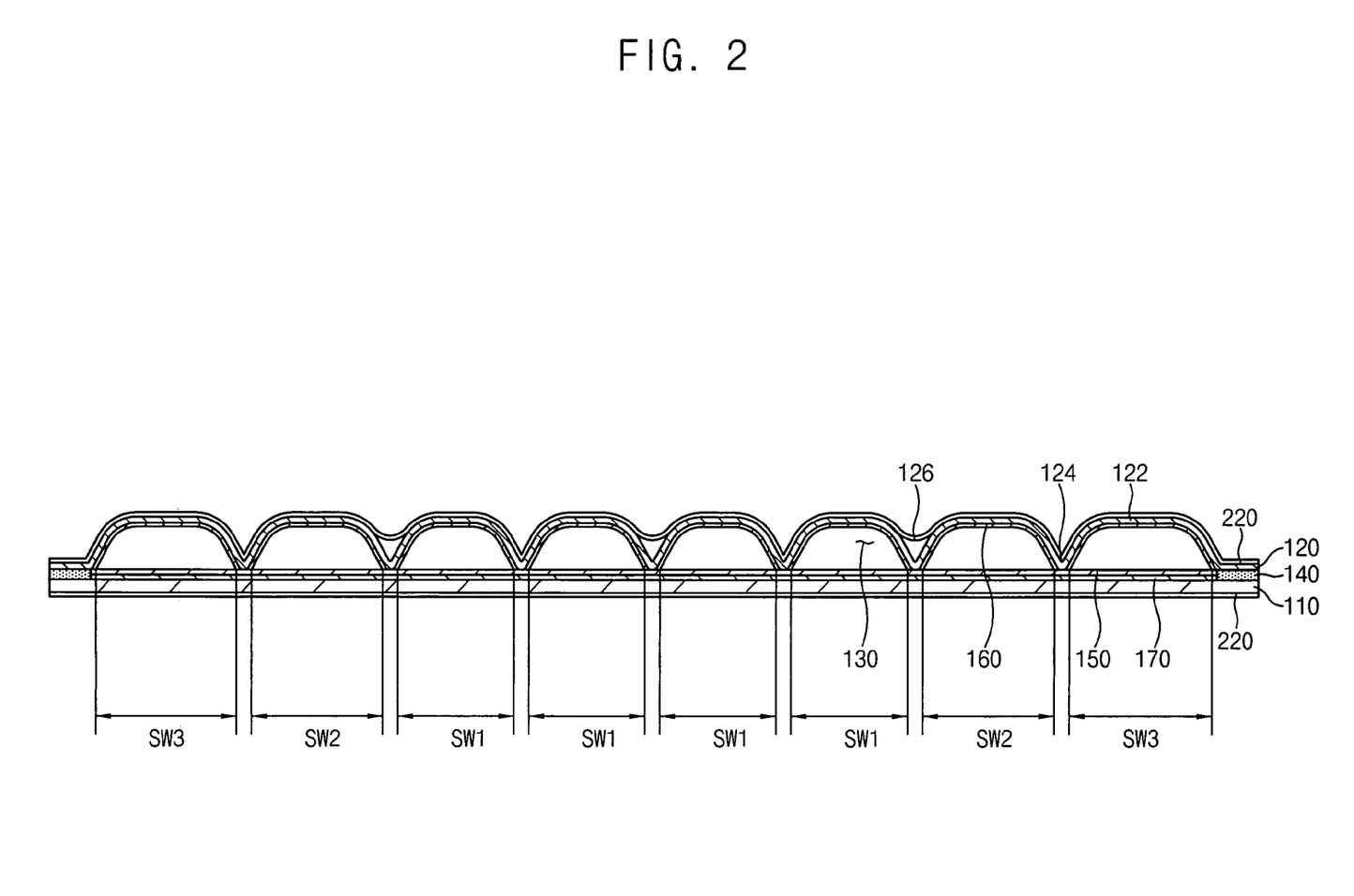
FIG. 2 is a cross-sectional view showing the light generating device of FIG. 1.
Figure 3:
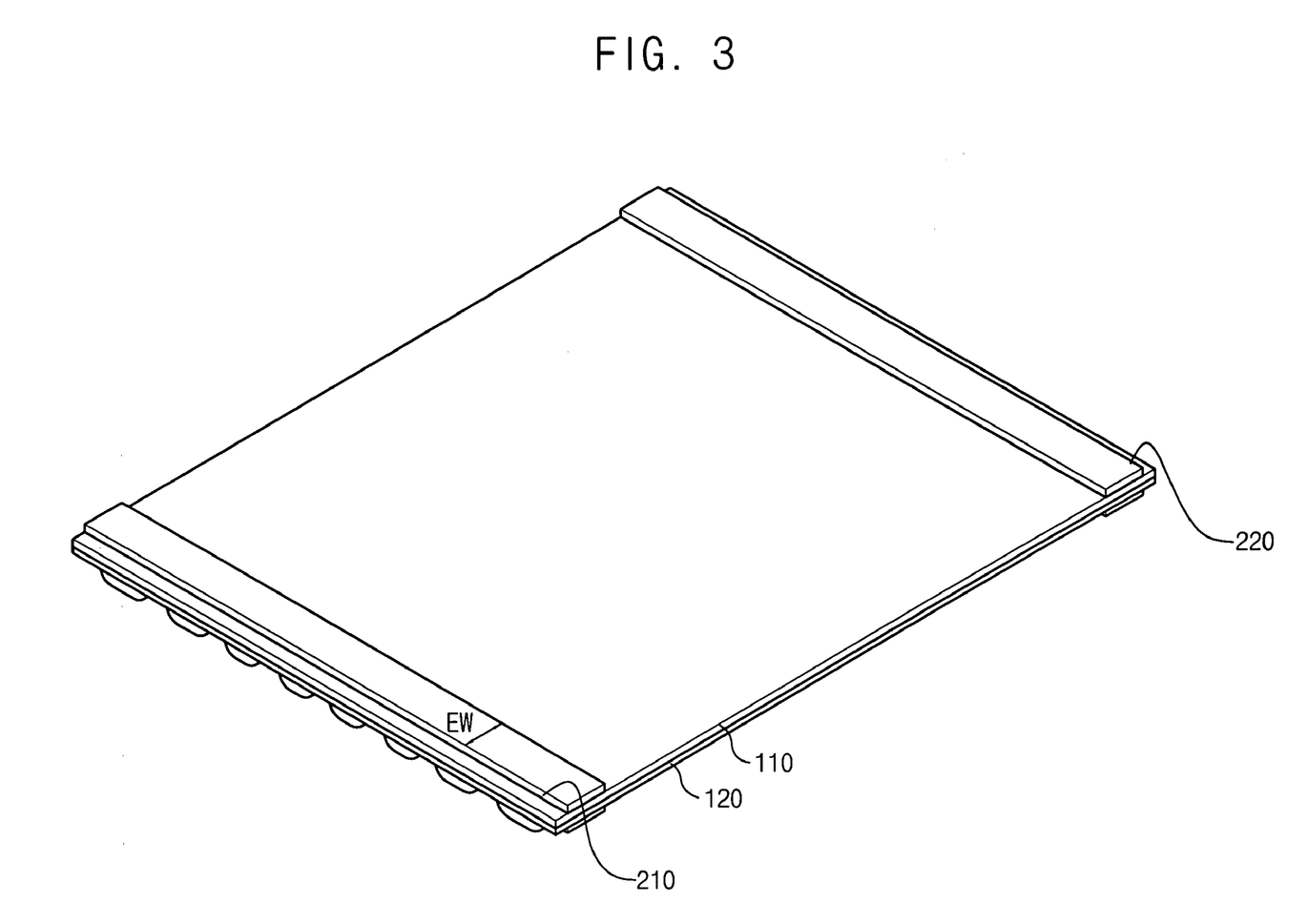
FIG. 3 is a perspective view showing a rear face of the light generating device of FIG. 1.

FIG. 1 is a perspective view showing a light generating device in accordance with an exemplary embodiment of the present invention, and FIG. 2 and FIG. 3 are cross-sectional and perspective views showing the light generating device of FIG. 1, respectively.

Referring to FIG. 1, FIG. 2 and FIG. 3, the light generating device 1000 may include a body 100, a first electrode 210 and a second electrode 220.

The body 100 may include a plurality of discharge spaces 130 to generate a planar light. The discharge spaces 130 may be substantially parallel with, and adjacent to, one another. The discharge spaces 130 may have different sizes and volumes from one another. For example, some discharge spaces 130 may have a different size from other discharge spaces 130 depending upon their locations.

The body 100 includes a first substrate 110 and a second substrate 120 joined together to form the discharge spaces 130.

The first substrate 110 may have a quadrangular plate shape. In this exemplary embodiment, the first substrate 110 is a glass substrate. A visible light may pass through the glass substrate, but an ultraviolet light may not.

The second substrate 120 may be a glass substrate having substantially the same material as the first substrate 110. The second substrate 120 may include a plurality of discharge space portions 122 and a plurality of space dividing portions 124. The discharge space portions 122 are separated from the first substrate 110 to form the discharge spaces 130. The space dividing portions 124, which define sides of the discharge spaces 130, contact the first substrate 110. As a distance between a side of the body 100 and the discharge spaces 130 decreases, a volume of the discharge spaces 130 may increase. In this exemplary embodiment, when the distance between the side of the body 100 and the discharge spaces 130 decreases, a horizontal width SW of the discharge spaces 130 may increase. In other words, the volume of the discharge spaces 130 may gradually increase along a direction away from the central portion of the body 100 toward the side of the body 100.

When the current flowing through the discharge spaces 130 increases, a luminance of the light generated in each of the discharge spaces 130 also increases. In this exemplary embodiment, since the size of the discharge space 130 adjacent to the side of the body 100 is greater than that at the central portion of the body 100, a current flowing through the discharge space 130 adjacent to the side of the body 100 may be greater than that at the central portion of the body 100. That is, when the horizontal width SW of a discharge space 130 increases, the volume of the discharge space 130 increases, thereby increasing an area of the discharge space 130 that is overlapped by the first and second electrodes 210 and 220. Therefore, a capacitance of the discharge space 130 increases, an impedance of the discharge space 130 decreases in substantially inverse proportion to the capacitance, and the current flowing through the discharge space 130 increases.

Therefore, the discharge space 130 adjacent to the side of the body 100 may be wider than the discharge space 130 at the central portion of the body 100. That is, the horizontal width SW of the discharge space 130 at an upper portion and a lower portion of the body 100 may be greater than that at the central portion of the body 100, thereby increasing the light luminance of the discharge spaces 130 adjacent to the sides of the body 100. Hence, the light generating device 1000 may provide uniform light luminance.

The number of the discharge spaces 130 of the body 100 may change with respect to the body's size and characteristics of a discharge in the discharge spaces 130. In this exemplary embodiment, the body 100 has eight discharge spaces 130. Four of the discharge spaces 130 at the central portion of the body 100 may be equally wide. That is, the four discharge spaces 130 at the central portion of the body 100 have a first horizontal width $SW_1$. Two of the discharge spaces 130 adjacent to sides of the body 100 have a third horizontal width $SW_3$, which is greater than the first horizontal width $SW_1$. The remaining discharge spaces 130 between the central portion and the sides of the body 100 have a second horizontal width $SW_2$, which is between the first and third horizontal widths $SW_1$ and $SW_3$.

As the size of the body 100 increases, the number of discharge spaces 130 may also increase. For example, there may be ten to one hundred discharge spaces 130. The light generated at the central portion of the body 100 may be uniform, regardless of the number of discharge spaces 130. When the horizontal widths SW of all discharge spaces 130 are substantially equal to one another, the light luminance of the discharge spaces 130 adjacent to the sides of the body 100 may be lower than that at the central portion of the body 100. In this case, three to five discharge spaces 130 may have the low luminance. Alternatively, the number of the discharge spaces 130 having the low luminance may be less than three or more than five. These low luminance discharge spaces 130 may be at the upper and lower portions of the body 100. Therefore, in this exemplary embodiment, the horizontal width SW of the discharge spaces 130 adjacent to the sides of the body 100 increases so that the light generating device 1000 may provide uniform luminance. Three to five discharge spaces 130 may have an increased horizontal width. The horizontal width SW of the discharge spaces 130 at the central portion of the body 100 may be about 10 mm, and the horizontal width SW of the discharge spaces 130 adjacent to the sides of the body 100 may be about 12 mm to about 13 mm.

The second substrate 120 may be formed through a molding process. That is, a plate-shaped base substrate may be heated and pressed in a mold to form the second substrate 120 with the discharge space portions 122 and the space dividing portions 124. Alternatively, the second substrate may be formed through a blow molding process in which the base substrate is heated and molded using an air compressor.

In this exemplary embodiment, a cross-sectional view of the second substrate 120 includes a plurality of trapezoidal shapes having curved corners. Alternatively, the cross-sectional view of the second substrate 120 may have a plurality of hemi-circular shapes, rectangular shapes, and other similar shapes.

The second substrate 120 may be combined with the first substrate 110 using adhesives 140. The adhesives 140 may be a frit having a lower melting point than a pure glass. The frit may have a mixture of a glass and a metal. That is, the adhesives 140 may be applied between the first and second substrates 110 and 120 to surround peripheral portions of the first and second substrates 110 and 120. In this exemplary embodiment, the adhesives 140 is not in the central region or a space between the first substrate 110 and the space dividing portions 124. The space dividing portions 124 contact the first substrate 110 due to a difference between an internal pressure of the discharge spaces 130 and a pressure outside the light generating device 1000. A vacuum may be created in the discharge spaces 130 after combining the first and second substrates 110 and 120, and a discharge gas for a plasma discharge may then be injected into the discharge spaces 130. A pressure of the discharge gas in the discharge spaces may be about 50 torr, which is less than an atmospheric pressure of about 760 torr. This pressure difference compresses the body 100 so that the space dividing portions 124 contact the first substrate 110.

The space dividing portions 124 may include a connecting passage 126 to connect adjacent discharge spaces 130. A portion of the first substrate 110 corresponding to the connecting passage 126 is spaced apart from the second substrate 120. Alternatively, the space dividing portions 124 may include a plurality of the connecting passages 126. In this exemplary embodiment, the connecting passages 126 are alternately formed at ends of the space dividing portions 124. That is, a connecting passage 126 is formed at an end of one space dividing portion 124, and a next connecting passage 126 is formed at an opposite end of the adjacent space dividing portion 124. The connecting passages 126 may be formed through the molding process. In this exemplary embodiment, the connecting passages 126 are formed with the space dividing portions 124 through the same molding process. Therefore, the discharge gas may be injected into the discharge spaces 130 through the connecting passages 126, which permits uniform pressure in the discharge spaces 130.

The body 100 may further include a first fluorescent layer 150, a second fluorescent layer 160 and a reflecting layer 170. The first and second fluorescent layers 150 and 160 may be formed corresponding to each other on the first and second substrates 110 and 120, respectively. That is, the first and second fluorescent layers 150 and 160 may be on an inner surface of the body 100. The reflecting layer 170 may be between the first substrate 110 and the first fluorescent layer 150. The plasma discharge's ultraviolet light irradiates into the first and second fluorescent layers 150 and 160, thereby generating excitons, which generate a visible light.

The reflecting layer 170 may reflect this visible light towards the second substrate 120, thereby preventing light leakage toward a rear face of the light generating device 1000.

The body 100 may further include a protecting layer (not shown) between the second substrate 120 and the second fluorescent layer 160 and/or between the first substrate 110 and the reflecting layer 170. The protecting layer (not shown) may prevent a chemical reaction between the first and second substrates and mercury of the discharge gas to maintain an amount of the mercury in the discharge spaces 130.

The first and second electrodes 210 and 220 may be formed on the body 100. In this exemplary embodiment, they are formed on an outer surface of the body 100. The first and second electrodes 210 and 220 overlap end portions of the discharge spaces 130, respectively, and they extend in a direction substantially perpendicular to a longitudinal direction of the space dividing portions 124. The first and second electrodes 210 and 220 may be band shaped, and they have a predetermined electrode width EW.

The first and second electrodes 210 and 220 may be formed on outer surfaces of the first and second substrates 110 and 120. This formation increases the overlapped area between the first electrode 210 and the discharge spaces 130 and between the second electrode 220 and the discharge spaces 130, thereby increasing the capacitance of the light generating device 1000. Alternatively, the first and second electrodes 210 and 220 may be formed on either the first or second substrate 110 or 120.

The first and second electrodes 210 and 220 may comprise a conductive powder such as copper (Cu), nickel (Ni), silver (Ag), gold (Au), aluminum (Al), chromium (Cr), or other like materials. The conductive powder may be a metal powder, and it may be spray coated on the body 100. That is, a mask (not shown) may be placed at a central portion of the body 100 where the first and second electrodes 210 and 220 will be formed. The conductive powder may then be sprayed on the body 100 having the mask (not shown), and the mask is removed to form the first and second electrodes 210 and 220 on the body 100. Alternatively, an aluminum tape may be attached to the body 100 to form the first and second electrodes 210 and 220, or they may be formed be coating silver paste on the body 100. The first and second electrodes 210 and 220 may include a transparent conductive material, such as indium tin oxide (ITO), indium zinc oxide (IZO), or other like materials. When the first and second electrodes 210 and 220 include the transparent conductive material, an effective light emitting area of the light generating device 1000 increases. Additionally, such first and second electrodes 210 and 220 may not block the light generated in the discharge spaces 130, thereby improving an image display quality of an LCD apparatus having the light generating device 1000.

The discharge voltage may be applied to the body 100 through the first and second electrodes 210 and 220 to generate the plasma in the discharge spaces 130.

Figure 4:
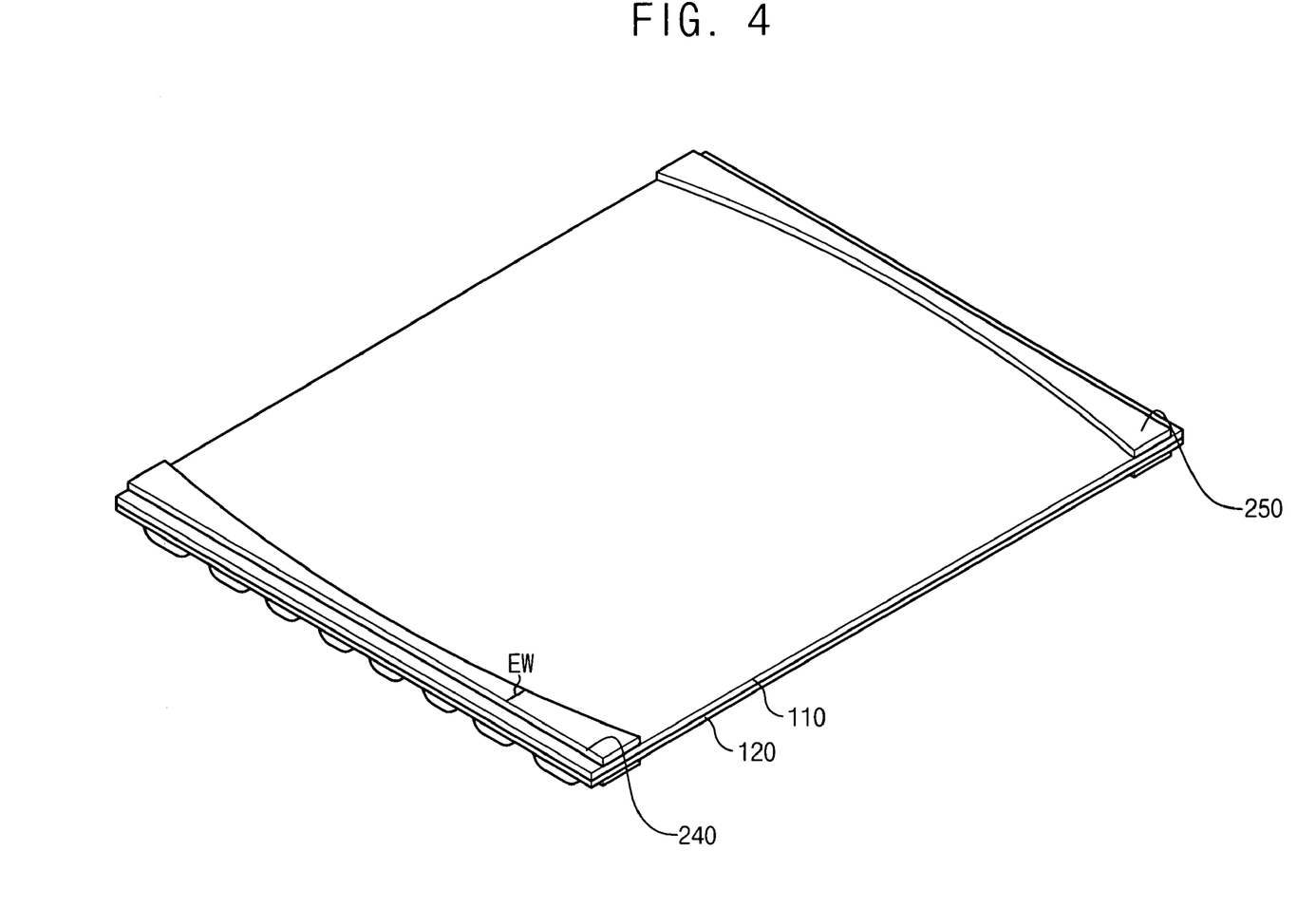
FIG. 4 is a perspective view showing a rear face of a light generating device in accordance with another exemplary embodiment of the present invention.

FIG. 4 is a perspective view showing a rear face of a light generating device in accordance with another exemplary embodiment of the present invention. The light generating device of FIG. 4 is the same as in FIG. 3 except for the first and second electrodes. Thus, the same reference numerals refer to the same or like parts as those described in FIG. 3 and any further explanation will be omitted.

Referring to FIG. 4, a first electrode 240 and a second electrode 250 may be formed at ends of a first substrate 110 and a second substrate 120. The first and second electrodes 240 and 250 are on outer surfaces of the first and second substrates 110 and 120, and they have a band shape having a curved side. Alternatively, the first and second electrodes 240 and 250 may have a stepped side. The first and second electrodes 240 and 250 may have different horizontal widths EW based on a distance from their respective sides. In other words, ends of the first and second electrodes 240 and 250 have a wider horizontal width EW than a central portion of the first and second electrodes 240 and 250. In this exemplary embodiment, the horizontal width EW of the first and second electrodes 240 and 250 gradually increases from their central portions in a longitudinal direction of the first and second electrodes 240 and 250. Is When the first and second electrodes 240 and 250 have a constant horizontal width EW, a light luminance of a discharge space 130, shown in FIG. 2, adjacent to a side of the light generating device may be less than that of a discharge space at the device's central portion. Accordingly, in this exemplary embodiment, ends of the first and second electrodes 240 and 250 are wider than the central portions, which increases an overlapped area between the discharge spaces 130 adjacent to the sides of the light generating device and the electrode ends, thereby increasing a current flowing through these discharge spaces. When the current flowing through the discharge spaces 130 adjacent to the sides of the light generating device increases, the device may provide uniform light luminance. In this exemplary embodiment, as discussed above, as the distance from the sides of the light generating device increases, the horizontal width EW of the first and second electrodes 240 and 250 decreases. Alternatively, the horizontal width EW of the first and second electrodes may vary with respect to optical characteristics of the light generating device 1000 and a volume of the discharge spaces 130.

Figure 5:
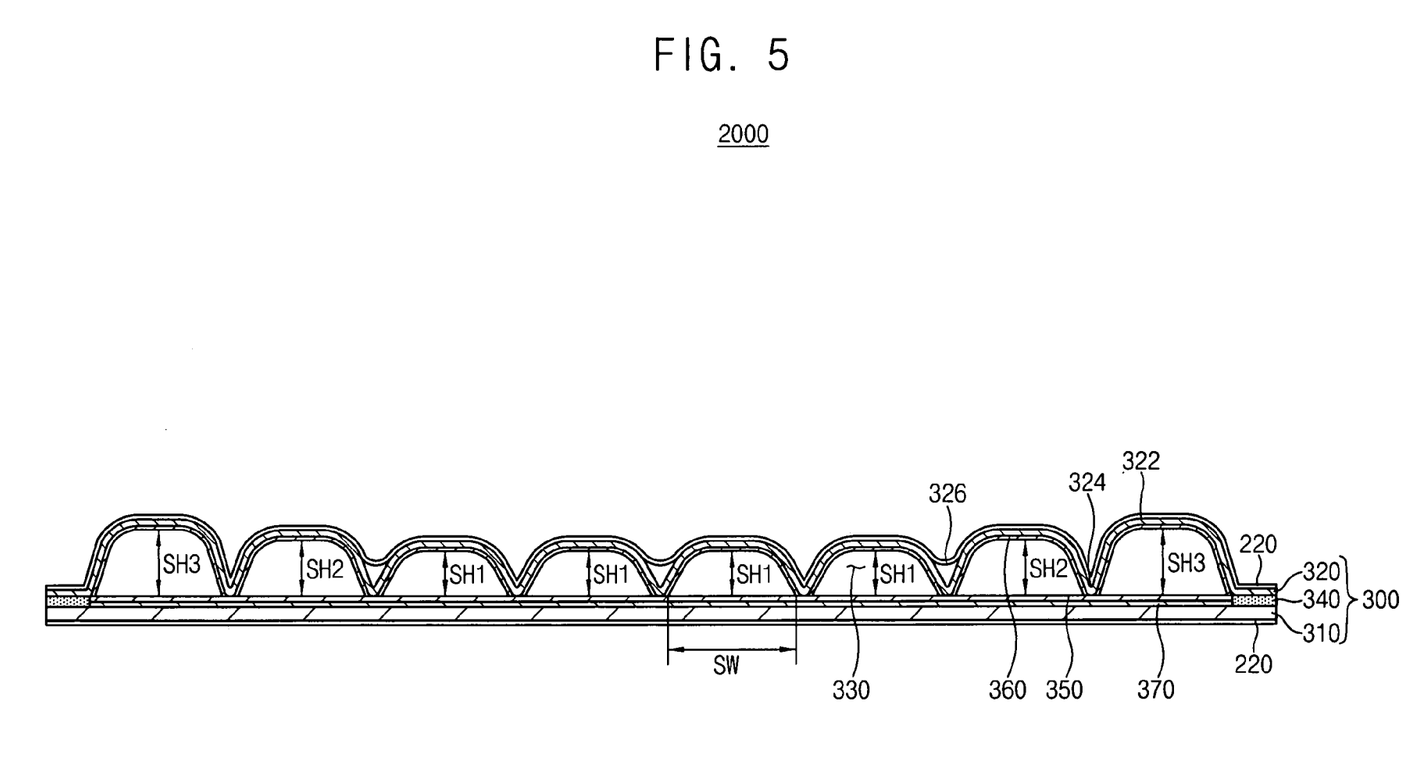
FIG. 5 is a cross-sectional view showing a light generating device in accordance with another exemplary embodiment of the present invention.

FIG. 5 is a cross-sectional view showing a light generating device in accordance with another exemplary embodiment of the present invention. The light generating device of FIG. 5 is the same as in FIG. 2 except for the second substrate. Thus, the same reference numerals refer to the same or like parts as those described in FIG. 2 and any further explanation will be omitted.

Referring to FIG. 5, the light generating device 2000 includes a plurality of discharge spaces 330. Some of the discharge spaces adjacent to a side of a body 300 may be larger than some of the discharge spaces at a central portion of the body 300.

The body 300 includes a first substrate 310 and a second substrate 320, which are combined using adhesives 340 to form the discharge spaces 330. The first substrate 310 has a flat plate shape, and the second substrate 320 has a plurality of discharge space portions 322 and a plurality of space dividing portions 324. The discharge space portions 322 are separated from the first substrate 310, and the space dividing portions 324 contact the first substrate 310. As a distance from the side of the body 300 increases, a volume of the discharge spaces 330 may decrease. In this exemplary embodiment, a height SH of the discharge spaces 330 adjacent to the sides of the body 300 may be greater than that at the central portion of the body 300. Consequently, an area where a first or second electrode 210 or 220 overlaps the discharge spaces 330 adjacent to the side of the body 300 is greater than the area where the first or second electrode 210 or 220 overlaps the discharge spaces 330 at the central portion of the body 300. The space dividing portions 324 may include a connecting passage 326 to connect adjacent discharge spaces 330. The body 300 may further include a first fluorescent layer 350, a second fluorescent layer 360 and a reflecting layer 370. Therefore, a luminance adjacent to the side of the light generating device 2000 may not decrease, and the light generating device 2000 may provide uniform light luminance.

In the exemplary embodiment of FIG. 5, the body 300 includes eight discharge spaces 330. Since the four discharge spaces 330 at the central portion of the body 300 have a first height $SH_1$, they have substantially the same volume as one another. However, the two discharge spaces 330 adjacent to the side of the body 300 have a third height $SH_3$, which is greater than the first height $SH_1$. The remaining two discharge spaces 330 between the central portion and the side of the body 300 have a second height $SH_2$, which is between the first and third heights $SH_1$, and $SH_3$. In this exemplary embodiment, widths SW of the discharge spaces 330 are substantially the same as one another. Alternatively, the widths SW of the discharge spaces 330 may differ. In this case, the discharge spaces 330 adjacent to the side of the body 300 may be wider than those at the central portion of the body 300.

When a size of the body 300 and the number of the discharge spaces 330 increase, the discharge spaces 330 adjacent to the side of the body 300 may have more than three different heights. The number of the discharge spaces 330 may change with respect to the size of the body 300 and characteristics of a discharge in the discharge spaces 330.

Figure 6:
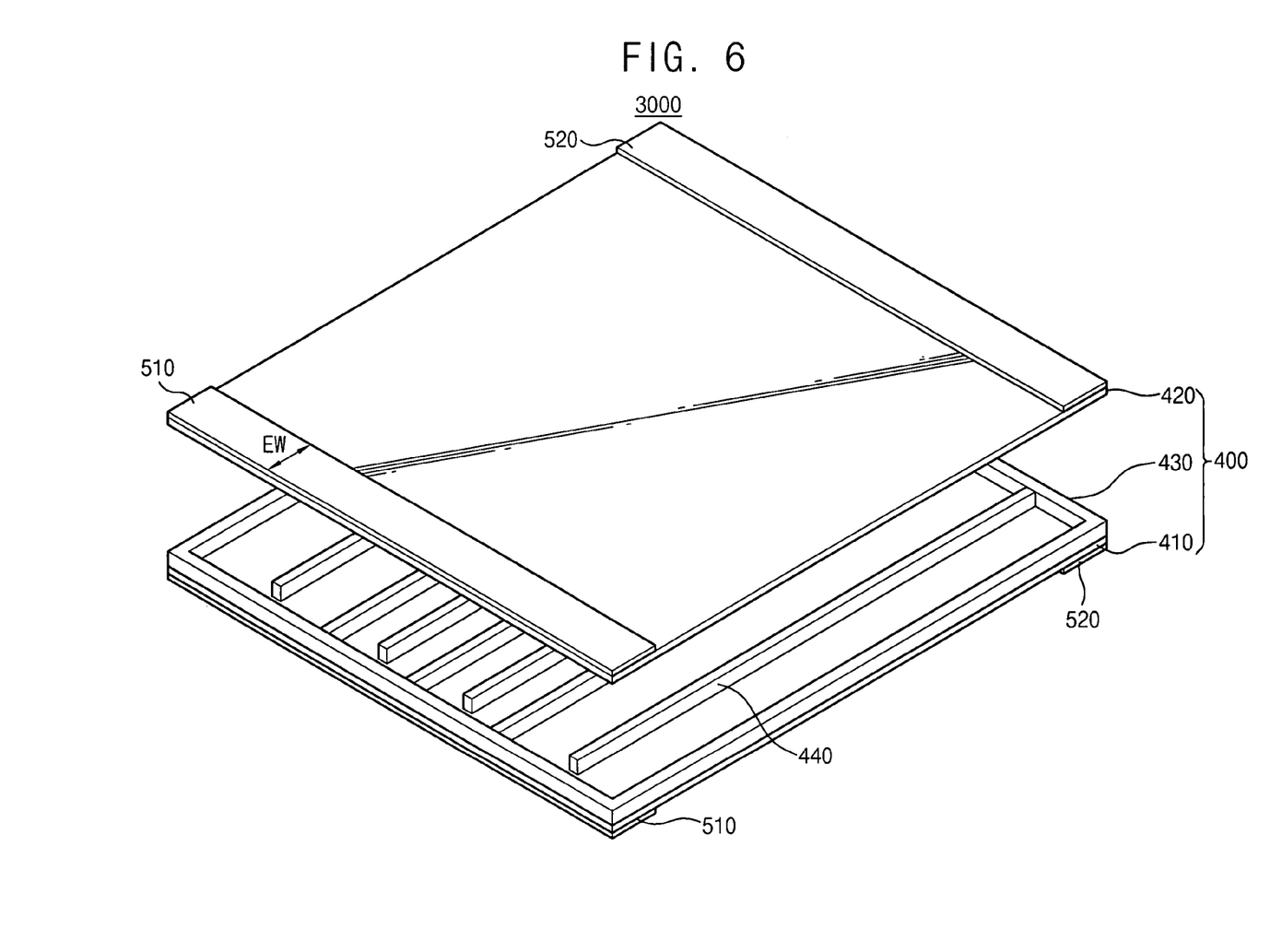
FIG. 6 is an exploded perspective view showing a light generating device in accordance with another exemplary embodiment of the present invention.
Figure 7:
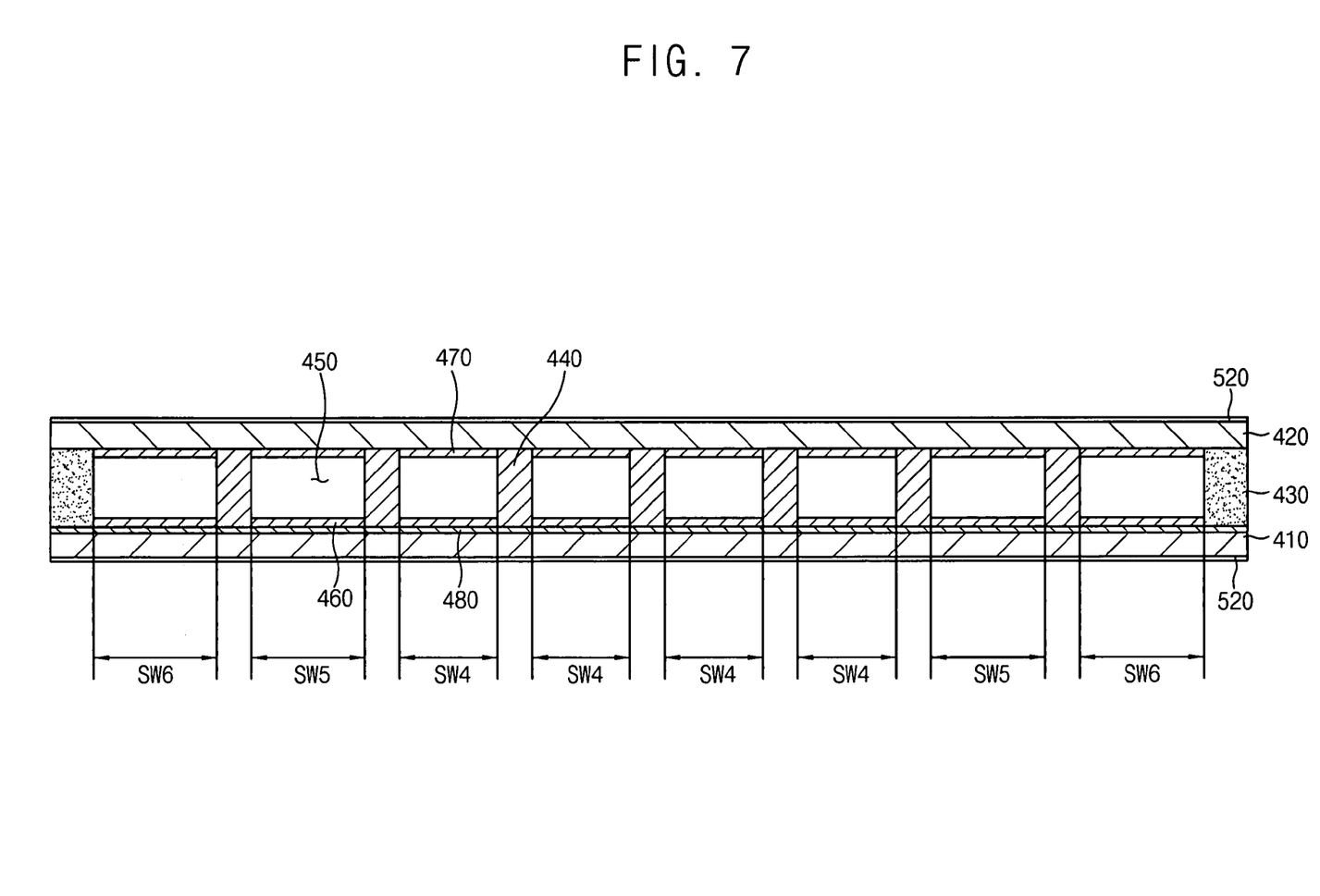
FIG. 7 is a cross-sectional view showing the light generating device of FIG. 6.

FIG. 6 is an exploded perspective view showing a light generating device in accordance with another exemplary embodiment of the present invention, and FIG. 7 is a cross-sectional view showing the light generating device of FIG. 6.

Referring to FIG. 6 and FIG. 7, the light generating device 3000 may include a body 400, a first electrode 510 and a second electrode 520.

The body 400 includes a first substrate 410, a second substrate 420 and a sealant 430. The second substrate 420 corresponds to the first substrate 410 and is separated from the first substrate 410 by a predetermined distance. The sealant 430 combines the first and second substrates 410 and 420 to form an internal space.

The first and second substrates 410 and 420 may have a flat plate shape, and they may be formed of glass. A visible light may pass through the glass substrate, and an ultraviolet light may not pass through the glass substrate. The sealant 430 may be interposed between the first and second substrates 410 and 420 along their edges, thereby forming the internal space in the body 400.

The body 400 may further comprise at least one space dividing member 440 between the first and second substrates 410 and 420. The space dividing members 440 may be substantially parallel with one another to divide the internal space into a plurality of discharge spaces 450. The space dividing members 440 extend in a predetermined direction, and they contact the first and second substrates 410 and 420.

In this exemplary embodiment, some of the discharge spaces 450 have a different size from the other discharge spaces 450. Intervals between the space dividing members 440 adjacent to a side of the body 400 may be greater than those at a central portion of the body 400 so that discharge spaces 450 adjacent to the side of the body 400 may be larger than discharge spaces at the central portion of the body 400.

When the body 400 has eight discharge spaces 450, four of the discharge spaces 450 at the central portion of the body 400 may have substantially the same size. Additionally, fourth widths $SW_4$ between adjacent space dividing members 440 at the central portion of the body 400 may be substantially the same as one another. Two of the discharge spaces 450 at the sides of the body 400 may be larger than the discharge spaces 450 at the central portion of the body 400. A sixth width $SW_6$ between the space dividing members 440 adjacent to the sides of the body 400 and the sealant 430 may be greater than the fourth width $SW_4$ at the central portion of the body 400. Two of the discharge spaces 450 between the central portion and the sides of the body 400 may be larger than the discharge spaces 450 at the central portion of the body 400, and smaller than the discharge spaces 450 adjacent to the sides of the body 400. In other words, a fifth width $SW_5$ between adjacent space dividing members 440 may be greater than the fourth width $SW_4$, and less than the sixth width $SW_6$. Alternatively, the fifth width $SW_5$ may be substantially equal to the sixth width $SW_6$.

When a size of the body 400 and the number of the discharge spaces 450 increase, the discharge spaces 450 adjacent to the sides of the body 400 may have more than three different widths. The number of the discharge spaces 450 may change with respect to the size of the body 400 and characteristics of a discharge in the discharge spaces 450.

FIG. 6 shows, the space dividing members 440 may be alternately arranged in the internal space, where one end of a space dividing member 440 contacts the sealant 430 and the other end is separated from the sealant 430, thereby forming a connecting passage between adjacent discharge spaces 450.

The body 400 may include a first fluorescent layer 460, a second fluorescent layer 470 and a reflecting layer 480. The first and second fluorescent layers 460 and 470 may be formed on inner surfaces of the first and second substrates 410 and 420 except where the space dividing members 440 are formed. The reflecting layer 480 may be formed between the first substrate 410 and the first fluorescent layer 460. The first and second fluorescent layers 460 and 470 may have a thin film shape. Alternatively, an auxiliary fluorescent layer (not shown) may be formed on the space dividing members 440. An ultraviolet ray generated by a plasma discharge in the discharge spaces 450 may irradiate into the first and second fluorescent layers 460 and 470 to generate excitons in the first and second fluorescent layers. A visible light may be generated in the first and second fluorescent layers 460 and 470 using the excitons. The reflecting layer 480 reflects the visible light toward the second substrate 420 to prevent light leakage through the first substrate 410.

A protecting layer (not shown) may be formed between the second substrate 420 and the second fluorescent layer 470, and between the first substrate 410 and the reflecting layer 480. The protecting layer may prevent a chemical reaction between the first or second substrate 410 or 420 with mercury in a discharge gas in the discharge spaces 450, thereby preventing a loss of mercury from the discharge spaces 450.

A first electrode 510 and a second electrode 520 may be formed on an outer surface of the body 400 in a direction substantially perpendicular to a longitudinal direction of the space dividing members 440. The first and second electrodes 510 and 520 may be formed on ends of the body 400, respectively, and they may overlap ends of the discharge spaces 450. In this exemplary embodiment, when a distance from a side of the body 400 increases, a width EW of the first and second electrodes 510 and 520 remains constant, as shown in FIG. 3. Alternatively, the width EW of the first and second electrodes 510 and 520 may decrease as a distance from the side of the body 400 increases, as shown in FIG. 4. In this exemplary embodiment, the first and second electrodes 510 and 520 may be formed on outer surfaces of the first and second substrates 410 and 420. Alternatively, the first and second electrodes 510 and 520 may be formed on an outer surface of the first substrate 410.

Figure 8:
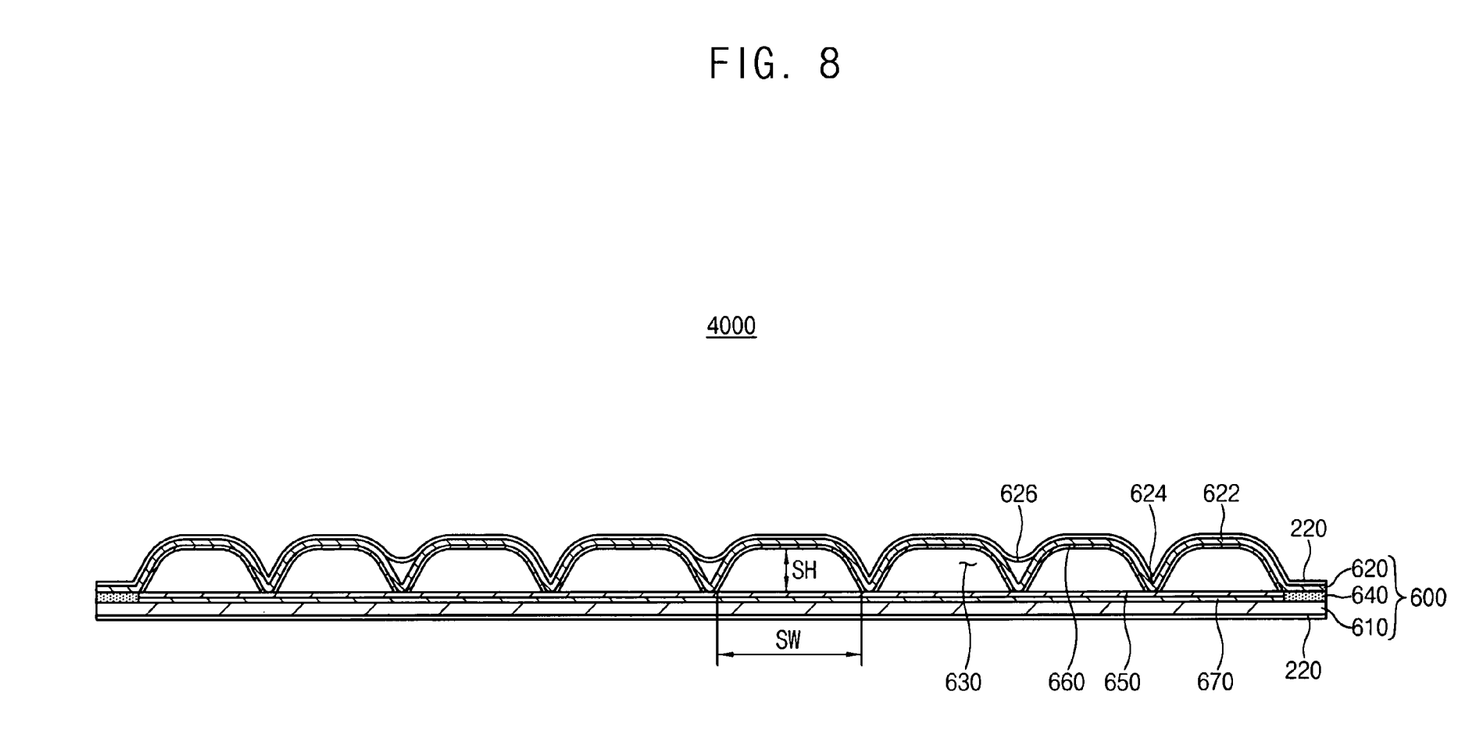
FIG. 8 is a cross-sectional view showing a light generating device in accordance with another exemplary embodiment of the present invention.

FIG. 8 is a cross-sectional view showing a light generating device in accordance with another exemplary embodiment of the present invention. The light generating device of FIG. 8 is the same as in FIG. 2 except for the second substrate. Thus, the same reference numerals refer to the same or like parts as those described in FIG. 2 and any further explanation will be omitted.

Referring to FIG. 8, the light generating device 4000 may include a plurality of discharge spaces 630. Volumes of the discharge spaces 630 adjacent to a side of a body 600 may be less than volumes of the discharge spaces 630 at a central portion of the body 600.

The body 600 includes a first substrate 610 and a second substrate 620 that are combined using adhesives 640 to form the discharge spaces 630. The first substrate 610 has a flat plate shape, and the second substrate 620 includes a plurality of discharge space portions 622 and a plurality of space dividing portions 624. The discharge space portions 622 are separated from the first substrate 610, and the space dividing portions 624 contact the first substrate 610. The discharge space portions 622 adjacent to the side of the body 600 may be narrower than the discharge space portions 622 at the central portion of the body 600. Alternatively, the discharge space portions 622 adjacent to the side of the body 600 may be lower than the discharge space portions 622 at the central portion of the body 600.

The width SW or the height SH of the discharge spaces 630 at the central portion of the body 600 may increase so that the volume of the discharge spaces 630 at the central portion of the body 600 also increases. The space dividing portions 624 may include a connecting passage 626 to connect adjacent discharge spaces 630 The body 600 may further include a first fluorescent layer 650, a second fluorescent layer 660 and a reflecting layer 670. Therefore, luminance of the central portion of the body 600 of the light generating device 4000 increases.

Figure 9:
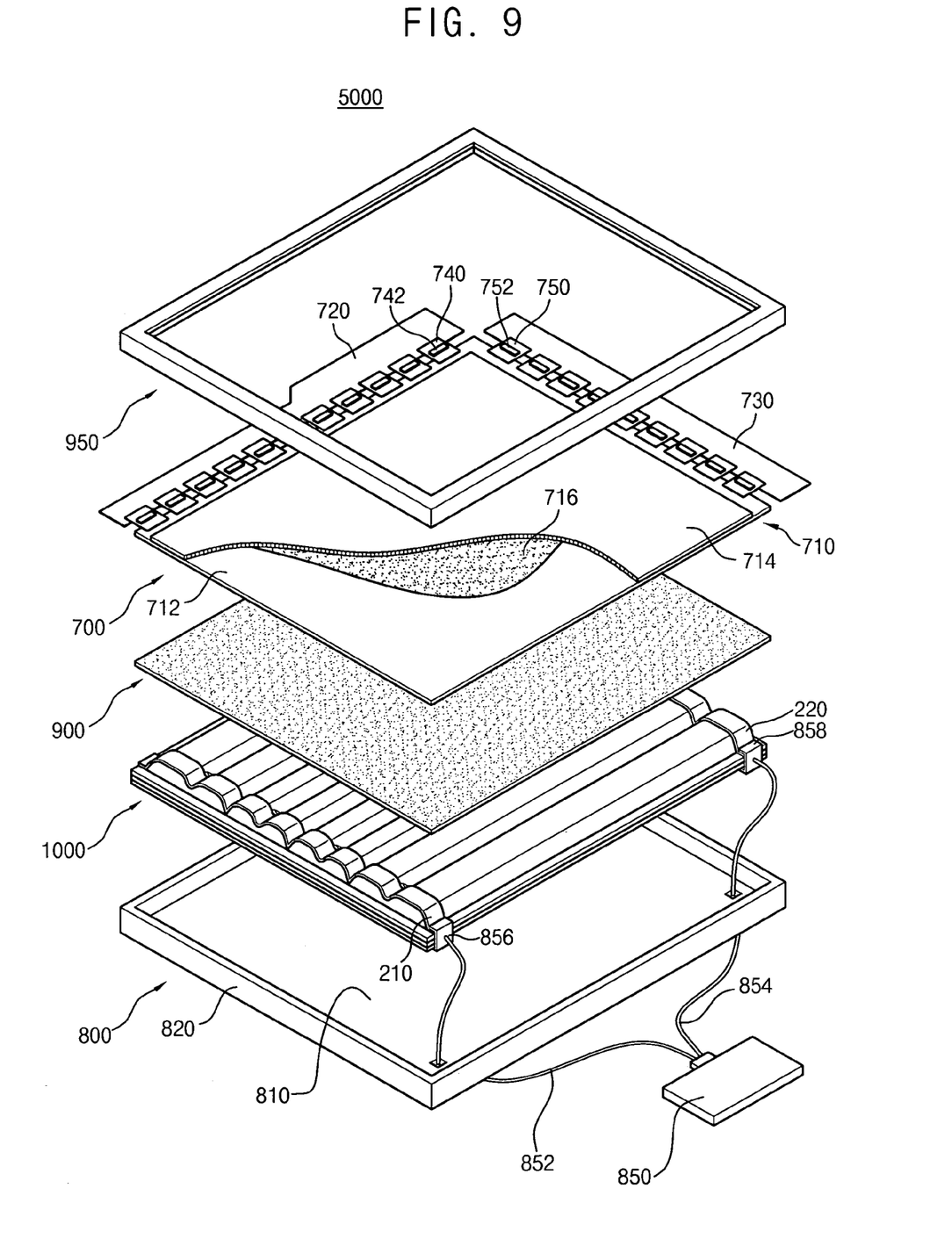
FIG. 9 is an exploded perspective view showing an LCD apparatus in accordance with an exemplary embodiment of the present invention.

FIG. 9 is an exploded perspective view showing an LCD apparatus in accordance with an exemplary embodiment of the present invention. A light generating device of the LCD apparatus of FIG. 9 may be the same as that shown in FIGS. 1 to 8. Thus, the same reference numerals refer to the same or like parts as those described in FIGS. 1 to 8 and any further explanation will be omitted.

Referring to FIG. 9, the LCD apparatus 5000 may include a light generating device 1000, a display unit 700, a receiving container 800 and an inverter 850.

The display unit 700 may include an LCD panel 710, a data printed circuit board (PCB) 720 and a gate printed circuit board (PCB) 730. The LCD panel 710 displays an image, and the data and gate PCBs 720 and 730 output a driving signal to the LCD panel 710 to drive the LCD panel. The driving signal may be applied from the data and gate PCBs 720 and 730 to the LCD panel 710 through a data flexible circuit film 740 and a gate flexible circuit film 750, respectively. Each of the data and gate flexible circuit films 740 and 750 may be a tape carrier package (TCP) or a chip on film (COF). The data and gate flexible circuit films 740 and 750 may include a data driving integrated circuit (IC) 742 and a gate driving IC 752, which control application of the driving signal to the LCD panel 710.

The LCD panel 710 includes a thin film transistor (TFT) substrate 712, a color filter substrate 714 and a liquid crystal 716. The color filter substrate 714 corresponds to the TFT substrate 712, and the liquid crystal 716 is interposed between the TFT and color filter substrates 712 and 714.

The TFT substrate 712 may be a transparent glass substrate having a plurality of switching elements (not shown) that are arranged in a matrix shape. A switching element (not shown) may comprise a TFT. A data line and a gate line may be coupled to a source electrode and a gate electrode of the TFT. A pixel electrode (not shown) having a transparent conductive material may be coupled to a drain electrode of the TFT.

The color filter substrate 714 may include red, green and blue color filters (not shown) that are formed as a thin film shape. A common electrode (not shown) that has a transparent conductive material may be formed on the color filter substrate 714.

When an electric power is applied to the gate electrode of the TFT to turn on the TFT, an electric field is formed between the pixel electrode and the common electrode. This electric field may change an arrangement of the liquid crystal 716, thereby changing a light transmittance of the liquid crystal 716 and displaying an image having a predetermined gray-scale.

The receiving container 800 may include a bottom plate 810 and a plurality of sidewalls 820. The light generating device 1000 may be placed on the bottom plate 810. The sidewalls 820 protrude from sides of the bottom plate 810 to form a receiving space. The light generating device 1000 is received in the receiving space to be fixed with the receiving container 800.

The inverter 850 may be on a rear surface of the receiving container 800 to generate a discharge voltage to drive the light generating device 1000. The discharge voltage generated by the inverter 850 may be applied to a first electrode 210 and a second electrode 220 of the light generating device 1000, respectively. In this exemplary embodiment, the first and second electrodes 210 and 220 are formed on a body 100, shown in FIG. 1, having the first and second substrates 110 and 120. The light generating device 1000 may further include a first conductive clip 856 and a second conductive clip 858 coupling the first and second electrodes 210 and 220 to a first power supply line 852 and a second power supply line 854, respectively.

The LCD apparatus 5000 may further include a fixing member 950 to fix a light diffusion member 900 and the LCD panel 710 to the receiving container 800. The light diffusion member 900 may be between the light generating device 1000 and the LCD panel 710.

The light diffusion member 900 diffuses a light generated from the light generating device 1000 so that a light having uniform luminance may be irradiated into the LCD panel 710. The light diffusion member 900 may have a flat plate shape having a predetermined thickness. Alternatively, the light diffusion member 900 may also have a thin diffusion sheet. The LCD apparatus 5000 may further include a prism sheet (not shown) between the light diffusion member 900 and the LCD panel 710 to improve luminance.

The fixing member 950 may surround the sides of the LCD panel 710. The fixing member 950 is combined with the receiving container 800 to fix the LCD panel 710 on the light diffusion member 900. The fixing member 950 may protect the LCD panel 710 from external impact, and it may also prevent the LCD panel 710 from moving inside the receiving container 800.

The LCD apparatus 5000 may also include a securing member (not shown) for securing the light generating device 1000 and the light diffusion member 900 with the receiving container 800 to guide the LCD panel 710 in the receiving container 800. The securing member (not shown) may be a mold frame, a side mold, etc.

According to exemplary embodiments of the present invention, a size of the discharge spaces adjacent to a side of a body increases so that a light generating device may provide a light with uniform luminance, thereby improving an image display quality of an LCD apparatus.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A light generating device, comprising:
   a body including a plurality of discharge spaces; and
   a first electrode and a second electrode on the body and overlapping with a first end portion and a second end portion of the discharge spaces, respectively,
   wherein volumes of at least two of the discharge spaces are different from each other and the discharge spaces include a first discharge space and a second discharge space that is closer to opposing sides of the body than the first discharge space, a volume of the second discharge space being greater than a volume of the first discharge space.

2. The light generating device of claim 1, wherein the plurality of discharge spaces extend in a first direction and the first and second electrodes each extend in a second direction substantially perpendicular to the first direction.

3. The light generating device of claim 1, wherein the body comprises:
   a first substrate having a plate shape; and
   a second substrate combined with the first substrate to form the discharge spaces,
   wherein the second substrate includes a plurality of discharge space portions separated from the first substrate and a plurality of space dividing portions contacting the first substrate to define the discharge spaces.

4. The light generating device of claim 3, wherein a horizontal width of the second discharge space is greater than a horizontal width of the first discharge space.

5. The light generating device of claim 4, wherein a horizontal width of a portion of the first electrode and the second electrode decreases as the distance from the side of the body increases.

6. The light generating device of claim 3, wherein a height of the second discharge space is greater than a height of the first discharge space.

7. The light generating device of claim 3, wherein a portion of each of the space dividing portions is opened so that a connecting passage is formed between adjacent discharge spaces.

8. The light generating device of claim 1, wherein the body comprises:
   a first substrate having a plate shape;
   a second substrate having substantially a same shape as the first substrate and separated from the first substrate; and
   a plurality of space dividing members between the first substrate and the second substrate to form the discharge spaces.

9. The light generating device of claim 8, wherein a distance between adjacent space dividing members decreases as a distance from a side of the body to a discharge space formed between the adjacent space dividing members increases.

10. The light generating device of claim 8, wherein one end of each of the space dividing members is separated from a sidewall of the body.

11. The light generating device of claim 1, wherein the body further comprises:
   a reflecting layer on an inner surface of the body; and
   a fluorescent layer on the reflecting layer.

12. A light generating device, comprising:
   a body including a plurality of discharge spaces substantially parallel with one another to generate the light; and
   a first electrode and a second electrode on the body and overlapping with a first end portion and a second end portion of the discharge spaces, respectively,
   wherein a volume of a discharge space at a central portion of the body is less than a volume of a discharge space adjacent to a side of the body, and
   wherein a width of a central portion of the first electrode and the second electrode is less than widths of end portions of the first electrode and the second electrode, respectively.

13. A liquid crystal display apparatus, comprising:
   a light generating device including:
   a body having a plurality of discharge spaces, volumes of at least two of the discharge spaces being different from each other and the discharge spaces including a first discharge space and a second discharge space that is closer to opposing sides of the body than the first discharge space, a volume of the second discharge space being greater than a volume of the first discharge space; and
   a first electrode and a second electrode on the body and overlapping with a first end portion and a second end portion of the discharge spaces, respectively;
   a receiving container that receives the light generating device;
   a liquid crystal display panel that displays an image using light generated from the light generating device; and
   an inverter coupled to a rear surface of the receiving container to apply a discharge voltage to the first electrode and the second electrode to drive the light generating device.

14. The liquid crystal display apparatus of claim 13, wherein a horizontal width of the second discharge space is greater than a horizontal width of the first discharge space.

15. The liquid crystal display apparatus of claim 13, wherein a height of the second discharge space is greater than a height of the first discharge space.

16. The liquid crystal display apparatus of claim 13, further comprising:
   a light diffusion member between the light generating device and the liquid crystal display panel; and
   a fixing member that fixes the liquid crystal display panel to the receiving container.

17. The liquid crystal display apparatus of claim 12, wherein the plurality of discharge spaces extend in a first direction and the first and second electrodes each extend in a second direction substantially perpendicular to the first direction.

18. The liquid crystal display apparatus of claim 13, wherein the plurality of discharge spaces extend in a first direction and the first and second electrodes each extend in a second direction substantially perpendicular to the first direction.

* * * * *